(12) United States Patent
Basedahl et al.

(10) Patent No.: US 11,824,958 B2
(45) Date of Patent: Nov. 21, 2023

(54) VERIFICATION MODULE AND VERIFICATION METHOD FOR 5G NEW RADIO APPLICATIONS

(71) Applicant: Rohde & Schwarz GmbH & Co. KG, Munich (DE)

(72) Inventors: Juergen Basedahl, Munich (DE); Lothar Walther, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 27 days.

(21) Appl. No.: 17/078,442

(22) Filed: Oct. 23, 2020

(65) Prior Publication Data
US 2022/0131950 A1   Apr. 28, 2022

(51) Int. Cl.
*H04L 67/75* (2022.01)
*G06F 3/04847* (2022.01)
(Continued)

(52) U.S. Cl.
CPC .......... *H04L 67/75* (2022.05); *G06F 3/04847* (2013.01); *H04L 41/0866* (2013.01); (Continued)

(58) Field of Classification Search
CPC ....... H04L 41/22; H04L 67/36; H04L 43/045; H04L 41/14; H04L 41/142; H04L 41/145; H04L 41/147; H04L 67/75; H04L 43/50; H04L 43/55; H04L 41/08; H04L 41/0803; H04L 41/0866; H04L 41/0869; H04L 41/0873; H04L 41/0876; H04L 41/0879; (Continued)

(56) References Cited

U.S. PATENT DOCUMENTS 5,987,306 A * 11/1999 Nilsen ................. H04M 3/2254
  455/67.11
6,597,666 B1 * 7/2003 Hemzal ................. G06Q 10/10
  370/252

(Continued)

*Primary Examiner* — Kieu D Vu
*Assistant Examiner* — Blaine T Basom
(74) *Attorney, Agent, or Firm* — CHRISTENSEN O'CONNOR JOHNSON KINDNESS PLLC (57) ABSTRACT

A verification apparatus for 5G New Radio applications includes a graphical user interface and a processing circuit. The graphical user interface is configured to receive a set of communication parameters from a user, the set of communication parameters being associated with communication parameters of a 5G communication channel. The set of communication parameters includes at least one of a frequency reference point A or an Absolute Radio Frequency Channel Number (ARFCN). The processing circuit is configured to analyze the set of communication parameters, thereby obtaining a set of analysis data. The processing circuit further is configured to at least one of complement the set of communication parameters with at least one missing communication parameter based on the set of analysis data, correct at least one communication parameter of the set of communication parameters based on the set of analysis data, or generate visualization data being associated with the set of communication parameters based on the set of analysis data. Further, a verification method for 5G New Radio applications is described.

18 Claims, 2 Drawing Sheets

(51) Int. Cl.
*H04L 43/045* (2022.01)
*H04L 41/22* (2022.01)
*H04L 41/14* (2022.01)
*H04L 41/0866* (2022.01)

(52) U.S. Cl.
CPC .............. *H04L 41/14* (2013.01); *H04L 41/22* (2013.01); *H04L 43/045* (2013.01)

(58) Field of Classification Search
CPC ............. H04L 41/0883; H04L 41/0889; H04L 41/0894; G06F 3/04847; H04W 16/00; H04W 16/18; H04W 16/22; H04W 24/02; H04W 24/06; H04W 24/08
See application file for complete search history.

(56) References Cited

U.S. PATENT DOCUMENTS

| | | | |
|---|---|---|---|
| 6,940,838 B1* | 9/2005 | Stead | H04W 16/18 370/335 |
| 2003/0217133 A1* | 11/2003 | Ostrup | H04L 41/0869 709/223 |
| 2010/0305931 A1* | 12/2010 | Fordham | H04W 16/18 703/13 |
| 2016/0183098 A1* | 6/2016 | Lim | H04L 41/22 455/12.1 |
| 2017/0109400 A1* | 4/2017 | Moore | G06F 16/26 |
| 2017/0235713 A1* | 8/2017 | Martensson | G06F 40/174 715/221 |
| 2017/0330099 A1* | 11/2017 | de Vial | G06Q 40/04 |
| 2018/0349023 A1* | 12/2018 | Taniguchi | G06F 3/04847 |
| 2019/0296983 A1* | 9/2019 | Clark | H04L 41/145 |
| 2019/0306348 A1* | 10/2019 | Dandoko | G06F 3/04883 |
| 2019/0364447 A1* | 11/2019 | Bucknell | H04W 24/08 |
| 2021/0168235 A1* | 6/2021 | Nakamura | H04B 17/23 |
| 2021/0194618 A1* | 6/2021 | Gorday | H04L 1/1812 |
| 2021/0195451 A1* | 6/2021 | Da Silva | H04W 36/0058 |

* cited by examiner

VERIFICATION MODULE AND VERIFICATION METHOD FOR 5G NEW RADIO APPLICATIONS

FIELD OF THE DISCLOSURE

Embodiments of the present disclosure generally relate to a verification module for 5G New Radio Applications. Embodiments of the present disclosure further relate to a verification method for 5G New Radio applications.

BACKGROUND

5G New Radio, also called 5G-NR, supports a large bandwidth ranging from below 1 GHz to above 50 GHz. Together with the flexible specifications of 5G New Radio, for example the flexible subcarrier spacing and the flexible bandwidth that can be used by individual user equipment devices, this allows fulfilling different requirements of different use cases.

For example, 5G New Radio allows for large communication bandwidths, such as in the enhanced mobile broadband (eMBB) use case. Moreover, 5G New Radio allows for ultra-reliable low-latency communications (URLLC) as well as for massive machine type communications (mMTC).

The downside of this great flexibility is that setting up 5G New Radio communication systems is considerably more complex than setting up a communication with previous mobile communication standards, as there is a plurality of communication parameters that have to be set, wherein these communication parameters are partially interdependent of each other.

Thus, there is a need for devices and methods that simplify setting up 5G New Radio communication systems and to verify the respective settings.

SUMMARY

Embodiments of the present disclosure provide a verification apparatus for 5G New Radio applications. The verification apparatus comprises a graphical user interface and a processing circuit, such as a processing module. The graphical user interface is configured to receive a set of communication parameters from a user, the set of communication parameters being associated with communication parameters of a 5G communication channel. The set of communication parameters comprises at least one of a frequency reference point A and an Absolute Radio Frequency Channel Number (ARFCN). The processing module is configured to analyze the set of communication parameters, thereby obtaining a set of analysis data. The processing module further is configured to complement the set of communication parameters with at least one missing communication parameter based on the set of analysis data, to correct at least one communication parameter of the set of communication parameters based on the set of analysis data, and/or to generate visualization data being associated with the set of communication parameters based on the set of analysis data.

Accordingly, the verification apparatus according to the present disclosure assists the user in one or more of the following ways:

The verification apparatus or rather the processing module may complement the set of communication parameters with at least one missing communication parameter. In other words, the user may input one or several communication parameters, and the processing module may automatically determine further communication parameters, which are dependent on the communication parameters already entered by the user. Thus, the user does not have to input all communication parameters, but only the independent communication parameters that are necessary, e.g. in order to fully define the communication channel (according to 5G New Radio).

Alternatively or additionally, the verification apparatus or rather the processing module may correct at least one communication parameter of the set of communication parameters input by the user. In other words, the processing module may analyze the set of communication parameters input by the user and may compare the set of communication parameters with a database of 5G New Radio specifications in order to check whether the individual communication parameters are compatible with each other. If one or several of the communication parameters are not compatible with each other, the processing module may automatically correct one or several of the communication parameters.

Alternatively or additionally, the verification apparatus or rather the processing module may generate the visualization data being associated with the set of communication parameters. In other words, the processing module generates a graphical representation of the communication parameters entered by the user such that the user gets a convenient overview of the already entered communication parameters and/or relationships between the entered communication parameters.

For example, the graphical representation may be associated with a frequency landscape, which may also be called frequency topology, of the 5G communication parameters.

In another example, the graphical representation may comprise a visualization of certain properties of the communication parameters, for example their respective magnitude. In some embodiments, the graphical representation may comprise labels, buttons and/or text.

Moreover, the processing module may be configured to convert the communication parameters input by the user into suitable units.

In general, the verification apparatus may be part of a computer system. In some embodiments, the verification apparatus may be established as software, such as a computer program product or computer readable media, running on or disposed in a personal computer, a laptop, a smart phone, a tablet, or on any other type of smart device.

Alternatively, the verification apparatus may be established as a combination of hardware and software, wherein the verification apparatus may be established as or integrated into a computer, a laptop, a smartphone, a tablet, or into any other type of smart device.

According to an aspect of the present disclosure, the graphical user interface is configured to display the visualization data. Thus, the visualization data being associated with the set of communication parameters may be presented to the user in an intuitive way by the graphical user interface. Accordingly, the graphical user interface does not only allow the user to input the set of communication parameters, but also gives a graphical/visual representation of the set of communication parameters.

According to another aspect of the present disclosure, the set of communication parameters is associated with a 5G downlink channel More precisely, the set of communication parameters may be associated with a downlink channel being associated with a user equipment device. Accordingly, the verification module can be used for setting up the user equipment, for example for operation in an already existing 5G New Radio network.

The verification apparatus may be configured to adapt operational parameters of a 5G New Radio user device based on the set of communication parameters input by the user, based on the at least one missing communication parameter, and/or based on the at least one corrected communication parameter. In other words, the user device may be set up for 5G communication at least partially automatic.

In an embodiment of the present disclosure, the set of communication parameters comprises at least one 5G frequency parameter other than the frequency reference point A or the ARFCN. In some embodiments, the processing module may be configured to generate the visualization data such that the at least one 5G frequency parameter is visualized with reference to the frequency reference point A or with respect to the ARFCN. In other words, the set of communication parameters may be visualized with reference to a generally acknowledged standard, namely the frequency reference point A or the ARFCN.

The visualization data may comprise a relationship between at least two individual communication parameters of the set of communication parameters. For example, the visualization data may comprise a difference between the at least two individual communication parameters. Alternatively or additionally, the visualization data may comprise a quotient of the at least two different individual communication parameters. Thus, the communication parameters are not only visualized with respect to their respective absolute values, but also with respect to their relative magnitudes.

According to a further aspect of the present disclosure, at least one of the frequency reference point A or the Absolute Radio Frequency Channel Number (ARFCN) is processed by the processing module to gather information concerning 5G communication channels. For example, the processing module may automatically determine the number of potential communication channels in a predefined interval above and/or below the frequency reference point A, or above and/or below the ARFCN.

In a further embodiment of the present disclosure, the set of communication parameters further comprises at least one of a carrier bandwidth, a central carrier frequency, a carrier offset, an offset to a frequency point A, a central SS/PBCH block frequency, a SS/PBCH block offset, a CORESET 0 central frequency, a CORESET 0 frequency offset, a CORESET n frequency, a CORESET n frequency offset, a bandwidth part (BWP) central frequency, and a bandwidth part frequency offset, wherein n is an integer bigger than 0 and smaller than 12. Accordingly, the set of communication parameters may comprise all communication parameters that are necessary to fully define a 5G (downlink) channel.

The visualization data may further comprise information on at least one of the least one missing communication parameter and an error comprised in the set of communication parameters. Thus, the user may be informed about missing communication parameters that still have to be input or that have been corrected automatically, e.g. by a warning message or an information message. Alternatively or additionally, the user may be informed about an error in the set of communication parameters input by the user, e.g. by a warning message or an information message.

As already described above, the processing module may correct the error automatically. For example, the visualization data may comprise an information message or warning message, informing the user that an error has been detected, and asking the user whether the error shall be corrected automatically.

According to an aspect of the present disclosure, the graphical user interface comprises at least one of a slider or a writable text field, which enables the user to input the set of communication parameters. The slider may have fixed length or an adjustable length. For example, the length of the slider may correspond to the bandwidth of the respective (frequency) communication parameter. A center position of the slider may correspond to a central (frequency) value of the respective communication parameter. Thus, the user may set the central (frequency) value and the bandwidth of the respective communication parameter by adjusting the position and the length of the slider, respectively.

According to another aspect of the present disclosure, the slider is confined to a portion of the graphical user interface being associated with an allowable communication parameter. In other words, the processing module may be configured to automatically determine an allowable interval for a particular communication parameter with respect to other communication parameters already input by the user. This way, the user is prevented from inputting values for a particular communication parameter that are incompatible with other communication parameters.

Embodiments of the present disclosure further provide a verification method for 5G New Radio applications. The verification method comprises the following steps:

receiving a set of communication parameters by a graphical user interface, the set of communication parameters being associated with communication parameters of a 5G communication channel, the set of communication parameters comprising at least one of a frequency reference point A or an Absolute Radio Frequency Channel Number (ARFCN);

processing the set of communication parameters, thereby obtaining a set of analysis data; and at least one of complementing the set of communication parameters with at least one missing communication parameter based on the set of analysis data, correcting at least one communication parameter of the set of communication parameters based on the set of analysis data, or generating visualization data being associated with the set of communication parameters based on the set of analysis data.

In some embodiments, the verification apparatus described above is configured to perform the verification method.

Regarding the advantages and further properties of the verification method, reference is made to the explanations given above with respect to the verification module, which also hold for the verification method and vice versa.

According to an aspect of the present disclosure, the visualization data is displayed by the user interface. Thus, the visualization data being associated with the set of communication parameters may be presented to the user in a lucid way by the graphical user interface. Accordingly, the graphical user interface does not only allow the user to input the set of communication parameters, but also gives a graphical representation of the set of communication parameters.

According to another aspect of the present disclosure, the set of communication parameters is associated with a 5G downlink channel More precisely, the set of communication parameters may be associated with a downlink channel being associated with a user equipment device. Accordingly, the verification apparatus can be used for setting up the user equipment, for example for operation in an already existing 5G New Radio network.

The set of communication parameters may comprise at least one 5G frequency parameter other than the frequency reference point A or the ARFCN. In some embodiments, the visualization data may be generated such that the at least one 5G frequency parameter is visualized with reference to the frequency reference point A or with reference to the ARFCN. In other words, the set of communication parameters may be visualized with reference to a generally acknowledged standard, namely the frequency reference point A or the ARFCN.

According to a further embodiment of the present disclosure, the visualization data comprises a relationship between at least two individual communication parameters of the set of communication parameters. For example, the visualization data may comprise a difference between the at least two individual communication parameters. Alternatively or additionally, the visualization data may comprise a quotient of the at least two different individual communication parameters. Thus, the communication parameters are not only visualized with respect to their respective absolute values, but also with respect to their relative magnitudes.

According to an aspect of the present disclosure, at least one of the frequency reference point A and the Absolute Radio Frequency Channel Number (ARFCN) is processed to gather information concerning 5G communication channels. For example, the number of potential communication channels in a predefined interval above and/or below the frequency reference point A, or above and/or below the ARFCN may be automatically determined.

According to another aspect of the present disclosure, the set of communication parameters further comprises at least one of a carrier bandwidth, a central carrier frequency, a carrier offset, an offset to a frequency point A, a central SS/PBCH block frequency, a SS/PBCH block offset, a CORESET 0 central frequency, a CORESET 0 frequency offset, a CORESET n frequency, a CORESET n frequency offset, a bandwidth part (BWP) central frequency, or a bandwidth part frequency offset, wherein n is an integer bigger than 0 and smaller than 12. Accordingly, the set of communication parameters may comprise all communication parameters that are necessary to fully define a 5G (downlink) channel.

In a further embodiment of the present disclosure, the visualization data further comprises information on at least one of the least one missing communication parameter and an error comprised in the set of communication parameters. Thus, the user may be informed about missing communication parameters that still have to be input or that have been corrected automatically, e.g. by a warning message or an information message. Alternatively or additionally, the user may be informed about an error in the set of communication parameters input by the user, e.g. by a warning message or an information message.

As already described above, the error may be corrected automatically. For example, the visualization data may comprise an information message or warning message, informing the user that an error has been detected, and asking the user whether the error shall be corrected automatically.

The graphical user interface may comprise at least one of a slider or a writable text field, which is used by the user for inputting the set of communication parameters. The slider may have fixed length or an adjustable length. For example, the length of the slider may correspond to the bandwidth of the respective (frequency) communication parameter. A center position of the slider may correspond to a central (frequency) value of the respective communication parameter. Thus, the user may set the central (frequency) value and the bandwidth of the respective communication parameter by adjusting the position and the length of the slider, respectively.

According to another aspect of the present disclosure, the slider is confined to a portion of the graphical user interface being associated with an allowable communication parameter. In other words, an allowable interval for a particular communication parameter may be automatically determined with respect to other communication parameters already input by the user. This way, the user is prevented from inputting values for a particular communication parameter that are incompatible with other communication parameters.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
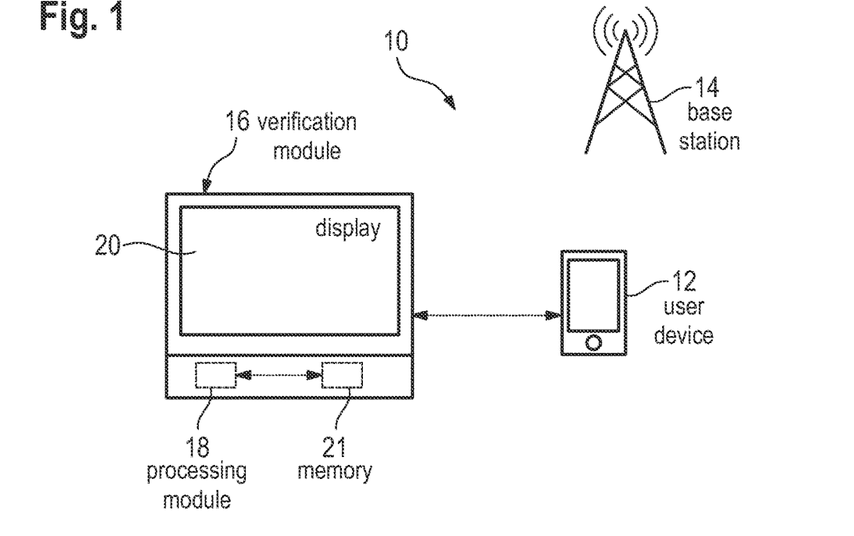
FIG. 1 schematically shows a 5G New Radio communication system with a verification apparatus according to an embodiment of the present disclosure.

FIG. 1 schematically shows a 5G New Radio communication system 10. The communication system 10 comprises a 5G New Radio user device 12, a 5G New Radio base station 14, and a verification apparatus, such as verification module 16, for 5G New Radio applications.

In some embodiments, the term "module" refers to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

Generally, the 5G New Radio base station 14 may be established by a base station emulator/simulator instead of a real base station. Accordingly, the 5G New Radio communication system 10 corresponds to a testing environment for testing the 5G New Radio user device 12 under certain conditions, for example simulated real world environments, in order to test its performance and/or characteristics with regard to at least one testing scenario applied.

The user device 12 is established as any kind of electronic device being configured to communicate via 5G New Radio.

For example, the user device 12 may be established as a mobile phone, as a tablet or as any other type of 5G-compatible (smart) device.

The base station 14 is configured to communicate with the user device 12 via a suitable protocol, such as a protocol referred to as 5G. Accordingly, the base station 14 is configured to transmit data to the user device 12 via a downlink channel of the user device 12 and to receive data from the user device 12 via an uplink channel of the user device 12.

In the exemplary embodiment of FIG. 1, the verification module 16 is established as a laptop comprising a processing circuit 18, a display 20, and a memory 21. However, it is to be understood that the verification module 16 may be established as or integrated into any other type of computing device, for example a smart phone, a tablet, or any other type of smart device. The verification module 16 is connected to the user device 12 in a signal transmitting manner Herein, the term "connected in a signal transmitting manner" is understood to denote a cable-based or wireless connection that is configured to transmit signals between the respective devices or components. In a testing environment, the verification module 16 may also be connected to the base station 14.

Figure 2:
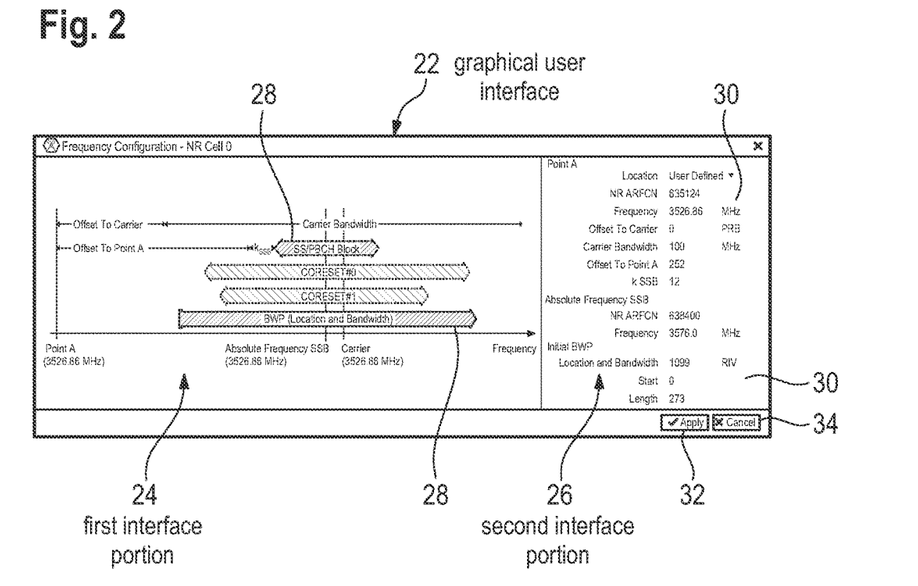
FIG. 2 shows a representative graphical user interface of the verification apparatus according to an embodiment of the present disclosure.

As is shown in FIG. 2, the verification module 16 comprises a graphical user interface 22. The graphical user interface 22 may be displayed on the display 20 of the verification module 16.

Generally speaking, the graphical user interface 22 is configured to receive user input being associated with 5G communication parameters, and to display information regarding the 5G communication parameters to the user. The individual communication parameters and the functionality of the graphical user interface 22 will be described in more detail below.

In general, the verification module 16 is configured to set 5G communication parameters of the user device 12 based on user input. In other words, a user may configure 5G communication properties of the user device 12 by the verification module 16. More precisely, the verification module 16 is configured to perform a verification method for 5G New Radio applications that is described in the following with reference to FIG. 3.

Figure 3:
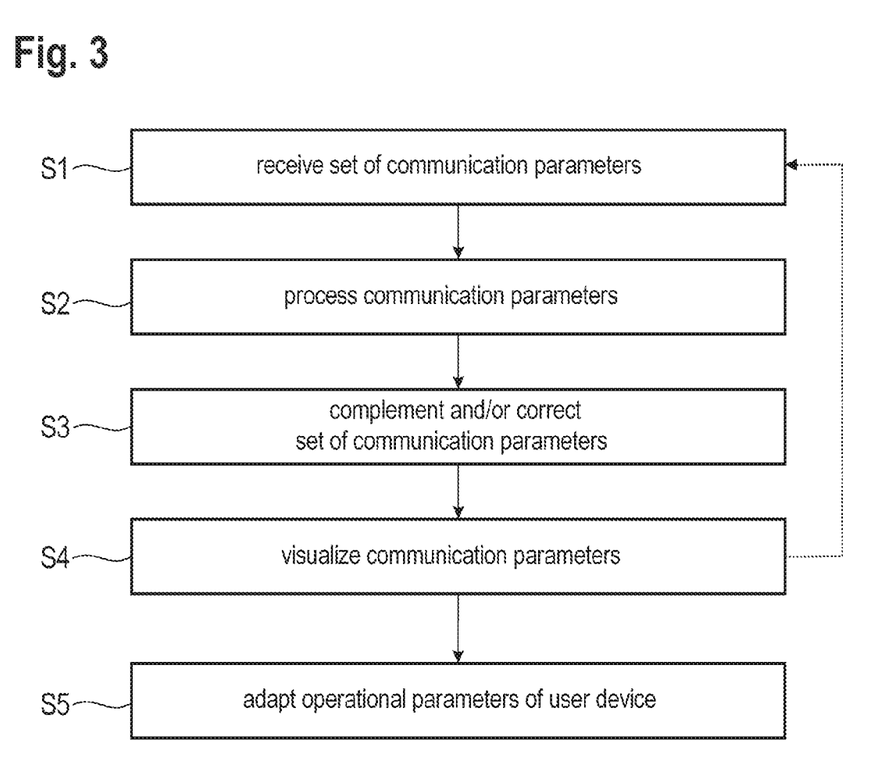
FIG. 3 shows a flow chart of a representative verification method according to the present disclosure.

A set of communication parameters is received from a user by the graphical user interface 22 (step S1). In general, the received communication parameters are associated with communication parameters of a 5G communication channel of the user device 12, for example with a downlink channel of the user device 12.

The received set of communication parameters comprises at least a frequency reference point A and/or an Absolute Radio Frequency Channel Number (ARFCN). The frequency reference point A and the ARFCN constitute a generally acknowledged standard reference point for configuring 5G (frequency) communication parameters of the user device 12.

Moreover, the received set of communication parameters may comprise one or more of the following 5G frequency parameters: a carrier bandwidth, a central carrier frequency, a carrier offset, an offset to a frequency point A, a central SS/PBCH block frequency, a SS/PBCH block offset, a CORESET 0 central frequency, a CORESET 0 frequency offset, a CORESET n frequency, a CORESET n frequency offset, a bandwidth part (BWP) central frequency, and/or a bandwidth part frequency offset, wherein n is an integer bigger than 0 and smaller than 12.

The user may input one or several of the communication parameters described above via the graphical user interface 22. For this purpose, the graphical user interface 22 may comprise a first interface portion 24 and a second interface portion 26.

The first interface portion 24 comprises several sliders 28, wherein each slider 28 is associated with exactly one of the 5G (frequency) communication parameters described above. The sliders 28 each may have a fixed length or an adjustable length. For example, the length of the sliders 28 may correspond to the bandwidth of the respective (frequency) communication parameters. Center positions of the sliders 28 may correspond to central (frequency) values of the respective communication parameters. Thus, the user may set the central (frequency) value and the bandwidth of the respective (frequency) communication parameters by adjusting the position and the length of the sliders 28. Therein, the sliders 28 each may be confined to a portion of the graphical user interface 22 being associated with an allowable communication parameter, i.e. a communication parameter that is compatible with the remaining communication parameters.

The second interface portion 26 comprises several writable text fields 30, wherein each of the writable text fields 30 is associated with exactly one of the 5G (frequency) communication parameters described above. The user may input one or several of the communication parameters described above by entering the respective value into the respective writable text field 30.

The set of communication parameters input by the user is processed and analyzed by the processing module 18, thereby obtaining a set of analysis data (step S2).

The set of communication parameters is complemented and/or corrected by the processing module 18 based on the set of analysis data if communication parameters are missing in the set of communication parameters or if there is an error in the set of communication parameters input by the user, respectively (step S3).

Thus, the verification module 16 or rather the processing module 18 may complement the set of communication parameters input by the user with at least one missing communication parameter. In other words, the user may input one or several communication parameters, and the processing module 18 may automatically determine further communication parameters, which are dependent on the communication parameters already entered by the user. Thus, the user does not have to input all communication parameters, but only the independent communication parameters that are necessary, e.g. in order to fully define the respective communication channel, for example the downlink channel of the user device 12.

Alternatively or additionally, the verification module 16 or rather the processing module 18 may correct at least one communication parameter of the set of communication parameters input by the user. In other words, the processing module may analyze the set of communication parameters input by the user and may compare the set of communication parameters with a database of 5G New Radio specifications saved in the memory 21 in order to check whether the individual communication parameters are compatible with each other. If one or several of the communication parameters are not compatible with each other, the processing module 18 may automatically correct one or several of the communication parameters.

Visualization data is generated by the processing module 18 based on the communication parameters entered by the user (step S4). The visualization data may be generated based on the complemented set of communication parameters, i.e. based on the missing communication parameters that have been added to the set of communication parameters by the processing module 18. Thus, the user may be informed about missing communication parameters that still have to be input or that have been added automatically, e.g. by a warning message or an information message.

Alternatively or additionally, the visualization data may be generated based on the at least one corrected communication parameter. For example, the visualization data may comprise an information message or warning message, informing the user that an error has been detected, and asking the user whether the error shall be corrected automatically.

The visualization data may further comprise relationships between at least two individual communication parameters. In some embodiments, the visualization data comprises a relationship between one or several of the (frequency) communication parameters described above to the frequency reference point A or to the ARFCN. The visualization data is displayed by the graphical user interface 22 on the display 20.

As is indicated by the dotted arrow in FIG. 3, the user may further adjust the set of communication parameters based on the information displayed via the graphical user interface 22. Thus, steps S1 to S4 described above may be repeated based on the adjusted set of communication parameters.

If all necessary communication parameters are set, the user may confirm the setting by pressing a corresponding button 32 of the graphical user interface 22. After confirmation of the settings by the user, the set of communication parameters may be transmitted to the user device 12, and operational parameters of the user device 12 may be adjusted based on the set of communication parameters (step S5).

Alternatively, the user may choose to cancel the setup procedure of the user device 12 by pressing a cancel button 34. Accordingly, the operational parameters of the user device may remain unchanged if the user presses the cancel button 34.

Summarizing, the verification module 16 described above assists the user in configuring 5G communication parameters of the user device 12 in one or more of several ways.

On one hand, the verification module may automatically add missing communication parameters. On the other hand, the verification module 16 may automatically correct errors in the set of communication parameters input by the user.

Moreover, the communication parameters being associated with the (downlink) communication channel of the user device 12 are visualized in a lucid way by the graphical user interface 22, such that the user gets a clear overview of the set of communication parameters, for example an overview of the relations between the individual communication parameters.

The a 5G New Radio communication system 10, including such components as, for example, the 5G New Radio base station 14, the verification module 16, etc., is configured to perform one or more steps schematically shown, for example, in FIG. 3. In some embodiments, one or more of these components includes one or more computer-readable media containing computer readable instructions embodied thereon that, when executed by one or more computer circuits (contained in or associated with the calibration setup 10 or components thereof), cause the one or more computer circuits to perform one or more steps of the method of FIG. 3 described above. In some embodiments, the one or more computer circuits, sometimes referred to as computing devices, includes a microprocessor, a microcontroller, a central processing unit, a graphics processing unit (GPU), a digital signal processor (DSP), an application specific integrated circuit (ASIC), etc. Of course, special purpose hardware-based computer systems or circuits can be also employed to perform one or more steps of the method of FIG. 3 described above.

In some embodiments, the one or more computer-readable media contains computer readable instructions embodied thereon that, when executed by the one or more computer circuits, cause the one or more computer circuits to perform one or more steps of any of the methods of claims 11-20. In some embodiments, computer-readable media is any medium that stores instructions, codes, data, or other information non-transitorily and is directly or indirectly accessible to a computer circuit, such as a processor (e.g., microprocessor, digital signal processor, graphics processor, etc.), etc. In other words, a computer-readable media is a non-transitory memory at which a computer circuit can access instructions, codes, data, or other information. As a non-limiting example, a computer-readable media may be a volatile random access memory (RAM), a persistent data store such as a hard disk drive or a solid-state drive, etc., or a combination thereof. In some embodiments, memory can be integrated with processor, separate from processor, or external to computing system.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously throughout the present disclosure.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some embodiments, the functionality described herein can be implemented by special purpose hardware-based computer systems or circuits, etc., or combinations of special purpose hardware and computer instructions.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A verification apparatus for 5G New Radio applications, the verification apparatus comprising:
   a graphical user interface configured to receive a set of communication parameters from a user, the set of communication parameters comprising communication parameters of a 5G communication channel, the set of communication parameters comprising at least one of a frequency reference point A or an Absolute Radio Frequency Channel Number (ARFCN); and
   a processing circuit configured to analyze the set of communication parameters, thereby obtaining a set of analysis data,
   the processing circuit also being configured to generate visualization data being associated with the set of communication parameters based on the set of analysis data, and
   the processing circuit being further configured to at least one of automatically complement the set of communication parameters with at least one missing communication parameter based on the set of analysis data, or automatically correct at least one communication parameter of the set of communication parameters based on the set of analysis data, such that the user is assisted in configuring the communication parameters of the 5G communication channel,
   wherein the graphical user interface comprises of a slider, which enables the user to input a particular communication parameter of the set of communication parameters,
   wherein the processing circuit is configured to automatically determine an allowable interval for the particular communication parameter with respect to other communication parameters already input by the user, and
   wherein the slider is confined to a portion of the graphical user interface being associated with the allowable interval, such that the user is prevented from inputting values for the particular communication parameter that are incompatible with the other communication parameters already input by the user.

2. The verification apparatus of claim 1, wherein the processing circuit is configured to generate the visualization data being associated with the set of communication parameters based on the set of analysis data, and wherein the graphical user interface is configured to display the visualization data.

3. The verification apparatus of claim 1, wherein the set of communication parameters is associated with a 5G downlink channel.

4. The verification apparatus of claim 1, wherein the set of communication parameters comprises at least one 5G frequency parameter other than the frequency reference point A or the ARFCN.

5. The verification apparatus of claim 1, wherein the processing circuit is configured to generate the visualization data being associated with the set of communication parameters based on the set of analysis data, and wherein the visualization data comprises a relationship between at least two individual communication parameters of the set of communication parameters.

6. The verification apparatus of claim 1, wherein at least one of the frequency reference point A or the Absolute Radio Frequency Channel Number (ARFCN) is processed by the processing circuit to gather information concerning 5G communication channels.

7. The verification apparatus of claim 1, wherein the set of communication parameters further comprises at least one of a carrier bandwidth, a central carrier frequency, a carrier offset, an offset to a frequency point A, a central SS/PBCH block frequency, a SS/PBCH block offset, a CORESET 0 central frequency, a CORESET 0 frequency offset, a CORESET n frequency, a CORESET n frequency offset, a bandwidth part (BWP) central frequency, or a bandwidth part frequency offset, wherein n is an integer bigger than 0 and smaller than 12.

8. The verification apparatus of claim 1, wherein the processing circuit is configured to generate the visualization data being associated with the set of communication parameters based on the set of analysis data, wherein the processing circuit is further configured to complement the set of communication parameters with the at least one missing communication parameter based on the set of analysis data, and wherein the visualization data further comprises information on the at least one missing communication parameter.

9. The verification apparatus of claim 1, wherein the processing circuit is configured to generate the visualization data being associated with the set of communication parameters based on the set of analysis data, wherein the processing circuit is further configured to correct the at least one communication parameter of the set of communication parameters based on the set of analysis data, and wherein the visualization data further comprises information on an error comprised in the set of communication parameters.

10. A verification method for 5G New Radio applications, the verification method comprising:
   receiving from a user, a set of communication parameters by a graphical user interface, the set of communication parameters comprising communication parameters of a 5G communication channel, the set of communication parameters comprising at least one of a frequency reference point A or an Absolute Radio Frequency Channel Number (ARFCN);

processing the set of communication parameters, thereby obtaining a set of analysis data;
generating visualization data being associated with the set of communication parameters based on the set of analysis data; and
at least one of automatically complementing the set of communication parameters with at least one missing communication parameter based on the set of analysis data, or correcting at least one communication parameter of the set of communication parameters based on the set of analysis data, such that the user is assisted in configuring the communication parameters of the 5G communication channel,
wherein the graphical user interface comprises of a slider, which is used by the user for inputting a particular communication parameter of the set of communication parameters,
wherein an allowable interval for the particular communication parameter with respect to other communication parameters already input by the user is automatically determined, and
wherein the slider is confined to a portion of the graphical user interface being associated with the allowable interval, such that the user is prevented from inputting values for the particular communication parameter that are incompatible with the other communication parameters already input by the user.

11. The verification method of claim 10, wherein the visualization data being associated with the set of communication parameters is generated based on the set of analysis data, and wherein the visualization data is displayed by the user interface.

12. The verification method of claim 10, wherein the set of communication parameters is associated with a 5G downlink channel.

13. The verification method of claim 10, wherein the set of communication parameters comprises at least one 5G frequency parameter other than the frequency reference point A or the ARFCN.

14. The verification method of claim 10, wherein the visualization data being associated with the set of communication parameters is generated based on the set of analysis data, and wherein the visualization data comprises a relationship between at least two individual communication parameters of the set of communication parameters.

15. The verification method of claim 10, wherein at least one of the frequency reference point A or the Absolute Radio Frequency Channel Number (ARFCN) is processed to gather information concerning 5G communication channels.

16. The verification method of claim 10, wherein the set of communication parameters further comprises at least one of a carrier bandwidth, a central carrier frequency, a carrier offset, an offset to a frequency point A, a central SS/PBCH block frequency, a SS/PBCH block offset, a CORESET 0 central frequency, a CORESET 0 frequency offset, a CORESET n frequency, a CORESET n frequency offset, a bandwidth part (BWP) central frequency, or a bandwidth part frequency offset, wherein n is an integer bigger than 0 and smaller than 12.

17. The verification method of claim 10, wherein the visualization data being associated with the set of communication parameters is generated based on the set of analysis data, wherein the set of communication parameters is complemented with the at least one missing communication parameter based on the set of analysis data, and wherein the visualization data further comprises information on the at least one missing communication parameter.

18. The verification method of claim 10, wherein the visualization data being associated with the set of communication parameters is generated based on the set of analysis data, wherein the at least one communication parameter of the set of communication parameters is corrected based on the set of analysis data, and wherein the visualization data further comprises information on an error comprised in the set of communication parameters.

\* \* \* \* \*